United States Patent [19]

Martin et al.

[11] Patent Number: 4,850,689
[45] Date of Patent: Jul. 25, 1989

[54] NEAR VISION CONTACT LENS AND METHODS OF MAKING AND USING IT

[75] Inventors: Bruce W. Martin, Gladwin; L. Edward Hensley, Bay City, both of Mich.

[73] Assignee: Bruce A. Martin, Gladwin, Mich.

[21] Appl. No.: 164,846

[22] Filed: Mar. 7, 1988

[51] Int. Cl.$^4$ .................... G02C 7/04; G02C 7/06; B24B 1/00

[52] U.S. Cl. ................ 351/161; 51/284 R; 351/160 H; 351/177

[58] Field of Search ............... 351/160 R, 160 H, 161, 351/162, 177; 51/284 R

[56] References Cited

U.S. PATENT DOCUMENTS

| | | | |
|---|---|---|---|
| 2,129,305 | 9/1938 | Feinbloom | 351/160 R |
| 2,347,488 | 4/1944 | Lawlor et al. | 351/160 R |
| 3,102,157 | 8/1963 | Gamber | 351/161 |
| 3,211,810 | 10/1912 | Gamber | 351/161 |
| 3,591,264 | 7/1971 | Forrest et al. | 351/161 |
| 3,794,414 | 2/1974 | Wesley | 351/160 R |
| 4,324,461 | 4/1982 | Salvatori | 351/161 |
| 4,332,443 | 6/1982 | Thomas | 351/160 H |
| 4,573,775 | 3/1986 | Bayshore | 351/161 |
| 4,614,413 | 9/1986 | Obssuth | 351/161 |
| 4,618,227 | 10/1986 | Bayshore | 351/161 |

FOREIGN PATENT DOCUMENTS 1217230 5/1960 France .
910455 11/1962 United Kingdom ............. 351/161

OTHER PUBLICATIONS

Bier, N.; "Prescribing for Presbyopia with Contact Lenses"; *Am. Jour of Optometry and Archives of Amer. Academy of Optometry;* vol. 44, No. 11; Nov. 1967; pp. 687 and 704–706.

Dickinson, F; "The Ultracon Prism Bifocal"; *The Optician;* vol. 140, No. 3636; Dec. 9, 1960; pp. 549–551.

Akiyama, K; "Study of Contact Lenses for Presbyopia"; *Contacto;* vol. 4, No. 5; May 1960; pp. 149–152.

*Primary Examiner*—Bruce Y. Arnold
*Assistant Examiner*—Scott J. Sugarman
*Attorney, Agent, or Firm*—Learman & McCulloch

[57] ABSTRACT

A near vision contact lens has a generally elliptical body of concavo-convex cross-sectional configuration with interior and exterior curvatures providing the desired power from the bottom to the extreme upper edge. The rounded ends of the body are so positioned that the major axis of the lens body is spaced substantionally above the lower edge of the lens body, and the rounded ends of the lens body provide a lateral positional stability as the eyes roll downwardly and converge, and each lens rides from the outer flatter lower periphery of the cornea up onto the more highly curved corneal cap with composite downward and inward rotation of the eyeball.

16 Claims, 2 Drawing Sheets

NEAR VISION CONTACT LENS AND METHODS OF MAKING AND USING IT

FIELD OF THE INVENTION

The present invention relates to contact lenses and more particularly to freely vertically floating segment lenses which translate readily from a position on the outer peripheral corneal surface of the eyeball below the central corneal cap in which they do not interfere with distance vision, to a position on the corneal cap in which they can provide a patient with normal near vision.

BACKGROUND OF THE INVENTION

Scleral and corneal lenses of varying design have been proposed and have been commercially available for a number of years. In addition, presbyopic contact lenses, such as the "anchored" lens disclosed in U.S. Pat. No. 4,614,413, have been proposed, as has a presbyopic lens which was designed to be adhesively secured to the upper margin of the lower eyelid. These prior art attempts to provide contact lenses for the correction of presbyopia have not enjoyed commercial acceptance, nor have circular lenses in which the reading correction was provided by a lower annular portion of the lens and a distance correction was provided by an upper annular portion of the lens. Such lenses have not achieved the positional stability or visual comfort level required, or have produced blurry vision or other vision defects. Segmental lenses such as disclosed in U.S. Pat. No. 4,573,775, which have sought to provide a corneal cap-covering portion, as well as an under-portion for presbyopic patients, have also not, to our knowledge, found acceptance for the same and other reasons.

SUMMARY OF THE INVENTION

It is a prime object of the present invention to provide a vertically free floating, concavo-convex segmental lens which fits the lower peripheral portion of the cornea and is designed to translate vertically to a position on the central corneal cap or pupillar region when a correction for presbyopic vision is desired, while retaining its lateral positional stability when the eyes converge for near task vision.

Another object of the invention is to provide a lens of the character described which responds little to the blinking action of the upper lid, while at the same providing the requisite vertical translatability sought.

Still another object of the invention is to provide a lens which can be comfortably worn and readily installed on, and removed from, the eye. The lens to be described is not dependent on scleral flanges for support, or any special palpebral edge supports or lower lid adhesives. It is a generally elliptically-shaped lens which is sufficiently thick overall as to have sufficient weight to maintain its normal position on the lower peripheral portion of the cornea without built-in prism ballast. The opposite ends of the lens are rounded differently to promote lateral positional stability as the eyes both roll downwardly and simultaneously converge for near vision focus and the upper edge is configured to pilot the lens to an operative position on the corneal cap.

Other objects and advantages of the invention will be pointed out specifically, or will become apparent from the following description when it is considered in conjunction with the appended claims and the accompanying drawings.

Figure 1:
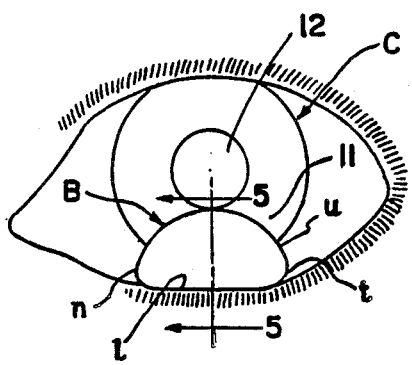
FIG. 1 is a front elevational view illustrating a typical lens of the invention in normal position on the eye.

Referring now more particularly to the drawings, the contact lens of the present invention may be fashioned of either conventional, hard or soft, contact lens materials in general use. As will later become apparent, the lenses, however, are somewhat thicker than those conventionally used and have a very different configuration. In the drawings, a hard contact lens has been illustrated which may be formed, for instance, of the well known commercially used materials, methyl methacrylate, fluorofocon A or dimefocon A. Soft lens materials which it is considered may be used are the conventional materials polymacon, bufilcon A, and tefilcon.

Figure 2:
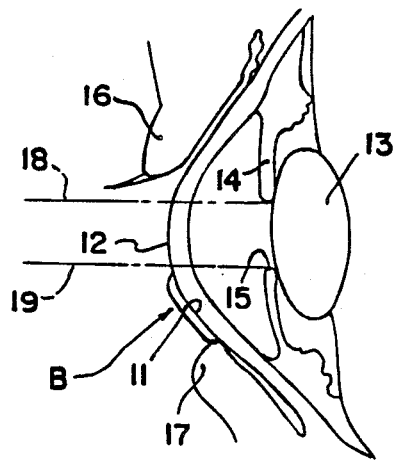
FIG. 2 is a schematic, side elevational view.
Figure 3:
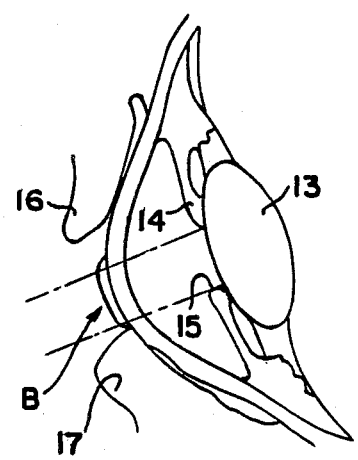
FIG. 3 is a side elevational view, similar to FIG. 2, in which the eye has rotated downwardly and the lens has translated upwardly to provide a presbyopic correction.
Figure 4:
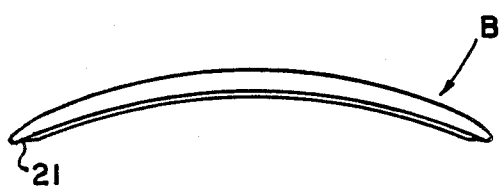
FIG. 4 is a top plan view of the lens only, on an enlarged scale.

The lens body, generally designated B, has a concave inner surface 10 (FIG. 5) shaped to fit the outer peripheral corneal surface 11 of the cornea C of the eye, which is somewhat less curved than the smaller central corneal cap 12. The anatomy of the eye is schematically depicted in FIGS. 2 and 3 as including, further, a lens 13 and an iris 14, with a pupil opening 15 in the iris 14. The field of vision between upper eyelid 16 and lower eyelid 17 is represented by the rays of light 18 and 19. The outer convex surface 20 of the lens body B is of a different curvature than the surface 10 so that their relative relationship provides the power of the lens. As disclosed, the surface 20 has a greater or less flat curvature to provide a lens of positive or plus power, suitable to correct presbyopia.

Figure 7:
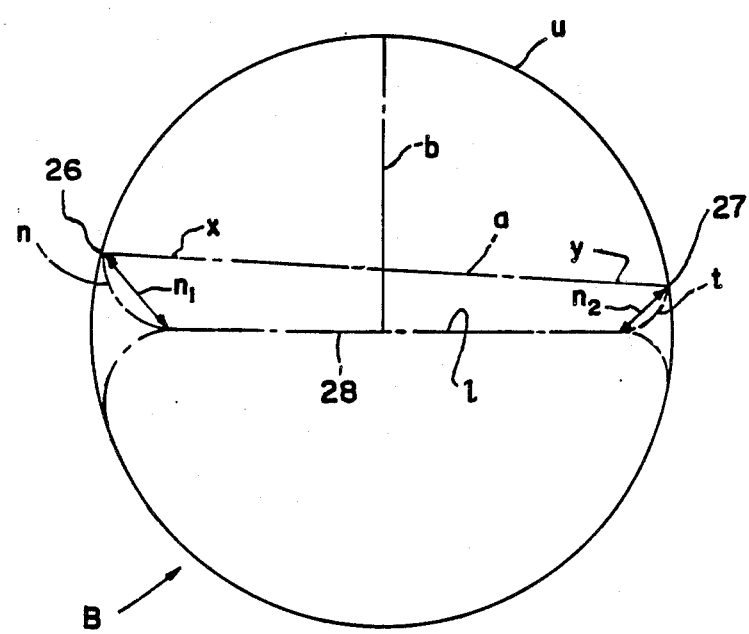
FIG. 7 is a front elevational view of an annular preform used in making the lenses, the broken lines illustrating the shape of a pair of lenses which are fashioned from the preform.

As FIG. 7 particularly indicates, the lens body B is of only generally elliptical shape, with a lateral major axis a which does not bisect the body and a vertical minor axis b slightly more than half as long. The lens has an upper curvilinear edge u and a flat lower edge 1, which generally conforms to the shape of the lower eyelid 17. The arcuate, nasal inferior rounded end n joins the surfaces u and 1 at the nasally adjacent end of the installed lens and the more acutely arced, or severely rounded, temporal inferior rounded end t joins the surfaces u and 1 at the opposite end of the lens body B. Thus the major axis a, through the centers x and y from which the radii of arcs n and t extend, is tilted with respect to lower edge 1 and is spaced substantially above it.

The upper surface u has a terminal edge which is particularly shaped to assist the vertical translatability which has been mentioned. The inner peripheral surface 10 merges with a more severely curved surface 21 which is shaped or corresponds to the curvature of the corneal cap 12. The upper edge u, of the lens body B is exteriorly bounded by a beveled surface 22 which gradually merges with the surface 21, the surfaces merging at a slightly rounded edge 23. For purposes of wearing comfort, the bottom edges of the lens are also slightly rounded at 24 and 25 adjacent the otherwise relatively flat bottom edge of the lens. At the juncture 26 and 27 of each of the ends n and t with the upper surface u, the surfaces 21–23 are gradually smoothed to merge with the surfaces n and t.

Figure 5:
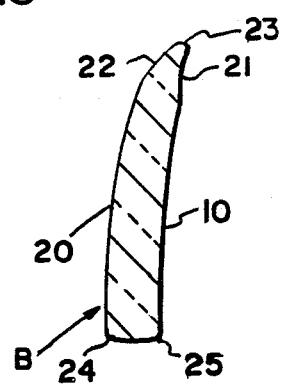
FIG. 5 is a enlarged, sectional, elevational view of the lens only, taken on the line 5—5 of FIG. 1.
Figure 6:
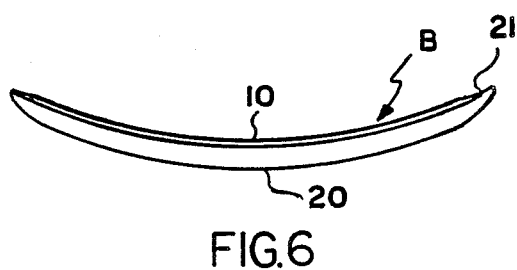
FIG. 6 is an enlarged inverse plan view of the lens only.

As FIG. 5 illustrates, the lens body B is of substantially uniform thickness between surfaces 10 and 20, and this same substantially uniform thickness extends from end to end of the lens body along the major axis a. Substantial uniformity is also vertically present along the minor axis b until the surfaces 21 and 22 are encountered at the upper edge u of the lens body. Thus, a good uniform weight distribution is provided which promotes vertical translatability without lateral displacement. The weight of the lens is sufficient to return the lens because of gravitational force when the eyeball rotates upwardly from a downwardly rolled position in which the lens was translated to the corneal cap, but is not so heavy that it cannot maintain itself on the eyeball via capillary attraction forces. The lens body thickness, except along the upper edges 21, 22, will be in the range 0.43 to 0.48 mm for non-hydrated hard contact lenses, which produces an overall weight in the range of 1½ to 2 grains. For soft contact lenses which will be in the neighborhood of 20 times as thick as conventional soft lenses, the thickness will be in the range 0.8 mm to 1.2 mm to produce a hydrated weight in the eye in the range of 6–7 grains and a dry weight in the range of 3–3.5 grains Typically, the lens body B, along the minor axis b, will be 3½ to 4 ½ mm high, and, along the major axis a, will be 7 to 8 mm wide. The curvilinear ends n and t are thus, in the FIG. 1 position, in engagement with the limbal region, which is the juncture of the corneal and white portions of the eye and provides a more acute or sharper border because the curvature of the white or scleral portion of the eye is flatter. Because the arcuate portions $n_1$ and $n_2$ (see FIG. 7) are of the thickness of lower edge 1, added weight at the end edges promotes lateral stability during vertical translational movement. Also, because the arc $n_1$ is longer and more gradual in curvature than arc $n_2$, inward turning of the eyeball with convergence causes the lens to take a slight nasal tilt in which the end n moves upwardly and is slightly raised in comparison to the end t, and thus accommodates to the converged position of the eyeball and retains lateral positional stability.

It is to be understood that the hard lens is designed to be worn directly on the eyeball but may be, also, piggybacked over a conventional soft lens which may or may not have a vision correction. Moreover, the lens could be a multi-focal lens wherein the correction is gradual and the convex curvatures creating the corrections blend one into the other.

THE OPERATION

During wear of the lens, the upper eye lid moves readily and easily over the upper edge of the lens and does not move it perceptively with normal blinking. With the eyeball in the FIG. 2 position, the lens is inoperative and performs no vision-correcting function. When the eyeballs rotate downwardly to the FIG. 3 position, and simultaneously converge however, the lens body B on each eye easily rides up to the position shown in FIG. 3 and function to provide a reading vision correction. In this position of the lens on the corneal cap 15, even though the surface 10 is flatter in curvature than the curvature of the corneal cap 15, there is still sufficient capillary attraction to hold the lens body L in position on the eyeball. When the eyeball rotates upwardly once again, the forces of gravity move the lens body B downwardly to the FIG. 2 position once again. The shape of ends n and t tend to maintain the lateral positional stability of the lens during this vertical translational movement and this is the reason for providing rounded, ellipse-like ends instead of essentially merging the upper lid surface u with the lower lid surface 1. As noted, the major axis a, while not bisecting the minor axis b, still is spaced a substantial distance above the lid lower edge 1. Lateral positional stability is also aided by the relative width to height configuration of the lens body which is approximately twice as long as it is high. During blinking, the lower lid, because of the blunt shape of the lower edge 1 holds the lens body up to permit the upper lid to pass over the beveled surface 22.

Figure 8:
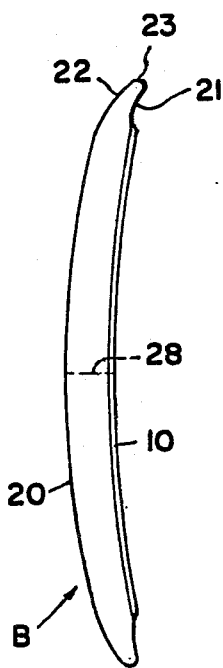
FIG. 8 is a side elevational view of the preform.

In FIGS. 7 and 8 we've demonstrated a method of making such lens bodies. What is initially formed is a preform of annular shape in which the surfaces 10 and 20 are of different curvature, dependent on the power desired, and the edge surfaces 21, 22 and 23 are annularly continuous. To form a pair of lens bodies B, the preform is diametrally bisected on line 28. Then the lens bodies are cut to form the ends n and t, and the surfaces 21, 22, and 23 are gradually smoothed at the juncture of portions 26 and 27 with the upper edge u to provide a transition without sharp edges. In the manner indicated, each annular preform produces a pair of lens bodies B of the required shape.

It is to be understood that the embodiments described are exemplary of various forms of the invention only and that the invention is defined in the appended claims which contemplate various modifications within the spirit and scope of the invention.

We claim:

1. A slideable near vision contact lens comprising:
   a. a transparent body of concavo-convex configuration having top, bottom, and end edges, and having a concave inner face shaped to the curvature of the lower periphery of the cornea of the eyeball, as distinguished from the corneal cap, and a convex outer surface of different curvature from substantially its upper edge to a lower edge according to the power of the lens;
   b. An elongate body having nasal and temporal arcuate ends facing the nose and temple of the lens wearer respectively and connecting its upper and lower edges, the nasal end of the body being curved generally on an arc having a greater radius than the more acute temporal end of the body: and
   c. the body being of sufficient thickness that it is supported on the lower eyelid without slipping between the eye and eyelid, and has enough weight to readily return to position on the lower corneal surface, while still retaining its position on the eyeball with good capillary attraction characteristics.

2. The invention of claim 1 wherein the body thickness except along the extreme upper edge, is substantially in the range 0.43 to 0.48 mm.

3. The invention of claim 2 wherein the body is of hard contact lens material.

4. The invention of claim 3 wherein the weight of the body is substantially in the range of 1½ to 2 grains.

5. The invention of claim 1 herein the body is of soft contact lens material.

6. The invention of claim 5 wherein the body thickness except along the extreme upper edge is substantially in the range 0.8 mm to 1.2 mm.

7. The invention of claim 6 wherein the weight of the hydrated body in the eye is substantially in the range of 6 to 7 grains.

8. The invention of claim 1 wherein the body is generally elliptical with the major axis eccentrically displaced from the upper edge, but spaced substantially above the lower edge.

9. The invention of claim 8 wherein the lower edge of the lens body is flat, the terminal upper edge of the body is beveled exteriorly and concaved to the shape of the corneal cap interiorily, and the terminal edge portions of the rounded ends of the body leading from the lower edge to the upper edge of the body are of the thickness of the lower edge.

10. The invention of claim 9 wherein the end edge portion of the rounded nasal end, leading from the lower edge of the body to the upper edge of the body, is longer in length than the corresponding edge portion of the curvilinear temporal end.

11. A vertically floating, near vision contact lens comprising:
   a. a generally elliptical transparent body of concavo-convex configuration having top, bottom, and end edges, and having a concave inner face shaped to the curvature of the lower periphery of the cornea of the eyeball as distinguished from the corneal cap, and a convex outer face of greater curvature from substantially its upper edge to a lower edge according to the power of the lens;
   b. the curvature of the upper edge of the body opposite its major axis being substantially greater than the configuration of the lower edge which conforms substantially to the configuration of the lower eyelid, and the body opposite its minor axis, having rounded nasal and temporal ends connecting its upper and lower edges, the temporal end being larger than the nasal end;
   c. the body being substantially uniform in thickness except along its terminal upper edge where the outer face convex curvature is beveled toward the concave inner face and the corresponding edge of said concave inner face is concavely curved to a greater curvature than the inner face to assist the lens to ride up on the corneal cap when the eye shifts downwardly for "reading vision"; and
   d. the body being of sufficient thickness so that it is supported on the lower eyelid without slipping between the eye and eyelid, and has enough weight to readily return to position on the lower corneal surface, while still retaining its position on the eyeball with good capillary attraction characteristics.

12. A method of utilizing a near vision contact lens comprising a transparent body of concavo-convex cross-sectional configuration having a concave inner face shaped to the curvature of the lower periphery of the cornea, as distinguished from the corneal cap, and a convex outer surface of a different curvature according to the power of the lens; the concave and convex curvatures extending from the lower edge of the body to the extreme upper edge portion of the body, and the body having differentially curved opposite end connecting the upper and lower edges, the nasal end of the body being curved generally on an arc having a greater radius than the temporal end; the steps of:
   a. placing the body in the eye to normally reside adjacent the lower periphery of the cornea, below the corneal cap and the normal plane of distance vision, and holding the lens in such position via capillary attraction;
   b. rotating the eyeball downwardly and inwardly and tilting the nasal end of the lens slightly upwardly while translating the lens vertically relatively to the corneal cap to provide a correction for near vision, while holding the lens in position via capillary attraction;
   c. rotating the eyeball upwardly to cause the lens to return from the corneal cap to the lower periphery of the cornea by gravity; and
   d. gripping the less curved portion of the limbal region and cornea with the greater contact surfaces provided by the rounded ends of the lens body to guide the lens to rise and return vertically while maintaining lateral positional stability.

13. The method defined in claim 12 wherein a piloting edge provided on the extreme upper interior edge surface of the lens assists translational movement.

14. The method defined in claim 12 wherein the lens is uniformly thick to produce sufficient weight to return readily via gravitational forces.

15. A method of making a generally elliptical, near vision contact lens of concavo-convex, cross-sectional configuration comprising the steps of:
   a. fashioning an annular transparent lens preform having a concave inner face shaped to the curvature of the lower portion of the cornea, as distinguished from the more highly curved corneal cap, and a convex outer surface of relatively greater curvature according to the power of the lens;
   b. diametrically bisecting the body; and
   c. machining each of the end portions of the semi-annular bodies to form rounded ends thereon and provide a generally elliptical lens in which the major axis connecting the radii of curvature of the rounded ends is spaced substantially above the bisected edge of the lens.

16. The method defined in claim 15 wherein the end fashioned at the nasal end of the lens is of less severe convexity than the end formed at the opposite end of the lens.

* * * * *